No. 764,901. PATENTED JULY 12, 1904.
L. SCHILDKNECHT.
DRIVE CHAIN.
APPLICATION FILED JAN. 7, 1904.
NO MODEL.
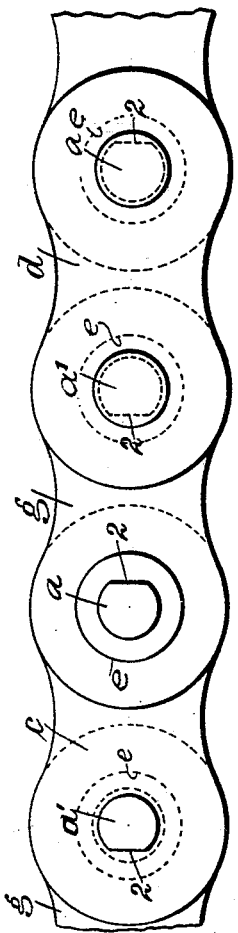
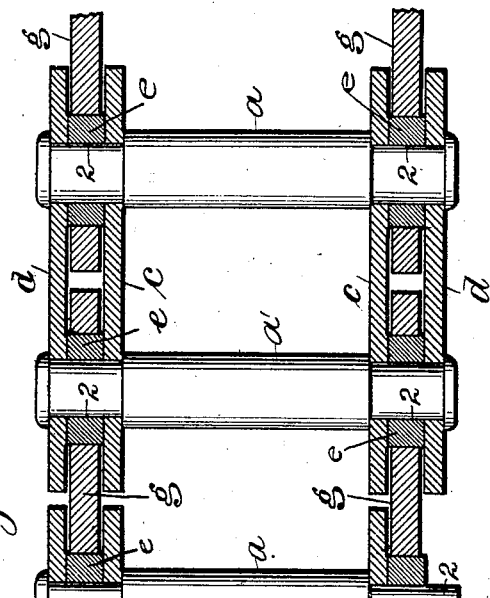
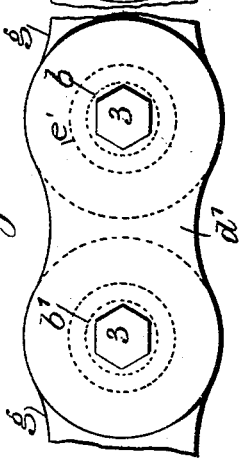
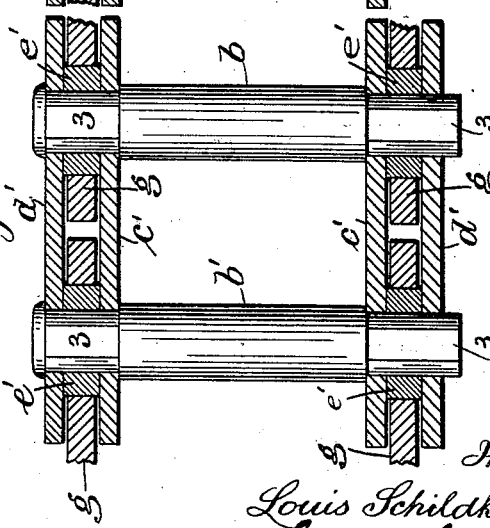
Witnesses
Inventor
Louis Schildknecht No. 764,901.

Patented July 12, 1904.

UNITED STATES PATENT OFFICE.

LOUIS SCHILDKNECHT, OF ASTORIA, NEW YORK.

DRIVE-CHAIN.

SPECIFICATION forming part of Letters Patent No. 764,901, dated July 12, 1904.

Application filed January 7, 1904. Serial No. 188,030. (No model.)

*To all whom it may concern:*

Be it known that I, LOUIS SCHILDKNECHT, a citizen of the United States, residing at Astoria, in the borough of Queens, city and State of New York, have invented an Improvement in Drive-Chains, of which the following is a specification.

My invention relates to a drive-chain—that is, a chain for the transmission of power from a prime mover to a device to be actuated; and the object of my invention is to relieve direct wear and strain as well as the turning moment from the chain-pins and connecting-links.

In constructing a chain according to my invention pairs of pins are firmly connected by pairs of spaced-apart links at the ends of the pins. The pairs of links are spaced apart by collars between them and around the reduced ends of the pins, and these parts are firmly riveted to place. The collars are advantageously about twice the thickness of the separate links, and other links slightly thinner than the collars extend around and connect adjacent collars of pairs of links, thus bringing together the links and collars which carry the direct-line strain and perform the turning moment between the links of the respective pairs. Means are provided for preventing the pins, the collars, and pairs of links turning with reference to one another, all of which are hereinafter more particularly described.

In the drawings, Figure 1 is a side elevation representing part of a drive-chain made according to my invention with an outer link and a collar removed at the left-hand side. Fig. 2 is a horizontal section and partial plan of the parts shown in Fig. 1. Fig. 3 is a side elevation and Fig. 4 a horizontal section representing a slightly-modified form of the invention.

$a$ $a'$, Figs. 1 and 2, represent chain-pins in pairs with reduced ends and with flat faces upon the outer portions of the reduced ends. $c$ and $d$ are spaced-apart links in pairs, between which are the collars $e$. The collars $e$ are of about twice the thickness of the links $c$ and $d$, and these links and collars are so formed at the openings for the reduced ends of the links that they fit over the said reduced ends and conform to the curved and flat surfaces thereof, the outer reduced ends of the chain-pins $a$ $a'$ being upset or riveted to securely hold the pairs of links and collars firmly in place upon the ends of the chain-pins, so that there is no movement or turning of the said parts with relation to one another. I provide links $g$, adapted to lie between the links $c$ and $d$ of the pairs and which links $g$ are slightly thinner than the collars $e$. These links have apertured ends which fit over the collars, and the collars are free to turn in the links with the movement of the chain.

In assembling the parts the links $c$ and the collars $e$ are first put in position over the reduced ends of the chain-pins $a$ $a'$. The links $g$ are next put in position over the collars. The links $d$ are then put in position as the outside members of the drive-chain, and the reduced ends of the chain-pins are then upset or otherwise treated, so as to securely hold the pairs of links $c$ and $d$ with the intermediate collars $e$ to the chain-pins, there then being no possibility of the pairs of chain-pins, the pairs of links $c$ $d$, and the collars $e$ turning or changing their relation. The collars $e$ are to be of hardened material, as are also the links $g$, and the turning moment is entirely in said collars and links $g$ with reference to one another, and it will be noticed that these collars and the links $g$ are in the center of the line of strain, because as between the pairs of chain-pins and links the said links $c$ and $d$, while a substantially integral structure, carry the strain as between the pairs of pins, while the collars and the links $g$ carry the strain, as well as perform the turning moment between the respective pairs of chain-pins and links.

The modified structure shown in Figs. 3 and 4 consists, essentially, in the reduced ends of the chain-pins $b$ $b'$, being provided with flat faces arranged in the form of a hexagon and fitting openings internally made to conform thereto or correspond therewith, it being a fact that where the chain-pins are provided either with the round surfaces and flat faces 2, as shown in Figs. 1 and 2, or with the hexagonal ends 3, as shown in Figs. 3 and 4, the non-turning function as between the links $c$ and $d$ or $c'$ and $d'$ and the chain-pins in pairs is the same. The links $c'$ $d'$ in pairs and the collars $e'$, (shown in Figs. 3 and 4,) correspond, respectively, with and perform the same function as the links $c$ $d$ and the collars $e$. (Shown in Figs. 1 and 2.) In this form of chain an essential function of the chain-pins is in holding the parts of the chain together, as there is no wear on the chain-pins, because no part turns upon or in direct relation to said chain-pins, the entire wearing-surfaces being reduced to the periphery of the collars and the internal surfaces of the links $g$ at the openings passing over the collars, and as the diameter of these collars is greatly in excess of the diameter of the reduced ends of the chain-pins and as the bearing-surfaces of said parts exceed in width the surfaces of the adjacent links the wearing-surfaces are therefore of maximum area and the wear is reduced to a minimum.

I claim as my invention—

1. A drive-chain, comprising chain-pins and pairs of links in groups, collars on the ends of the chain-pins between the links of the pairs of links, and intermediate links connecting the said groups and at their ends extending around said collars, substantially as set forth.

2. A drive-chain comprising chain-pins and pairs of links in groups, collars at the ends of the chain-pins between the connecting-links of the pairs, and which collars are of approximately twice the thickness of the links and links extending around said collars at their ends and connecting the aforesaid groups, and which links are slightly thinner than the collars so as to have a freedom of movement between the links of the pairs, substantially as set forth.

3. A drive-chain, comprising chain-pins and pairs of links in groups, said pins having reduced ends with shoulders, and their ends being upset or riveted over the links, collars at the ends of the chain-pins between the connecting-links of the pairs, and which collars are of approximately twice the thickness of the links, and links extending around said collars at their ends and connecting the aforesaid groups, and which links are slightly thinner than the collars so as to have a freedom of movement between the links of the pairs, said collars and links substantially as set forth.

Signed by me this 4th day of January, 1904.

LOUIS SCHILDKNECHT.

Witnesses:
 GEO. T. PINCKNEY,
 S. T. HAVILAND.